United States Patent [19]

Schmidt

[11] 4,212,405
[45] Jul. 15, 1980

[54] ALUMINUM PANEL CONTAINER OR TRAILER BODY

[75] Inventor: George A. Schmidt, 370 Winchester Ave., Langhorne, Pa. 19047

[73] Assignee: Srick Corporation, Fairless Hills, Pa.

[21] Appl. No.: 232,448

[22] Filed: Mar. 7, 1972

Related U.S. Application Data

[63] Continuation-in-part of Ser. No. 868,772, Oct. 23, 1969, abandoned.

[51] Int. Cl.³ .......................... B65D 88/12; B65D 6/34
[52] U.S. Cl. ......................................... 220/1.5; 220/71
[58] Field of Search ..................... 220/1.5, 71

[56] References Cited

U.S. PATENT DOCUMENTS

| | | | |
|---|---|---|---|
| 2,715,971 | 8/1955 | Cox | 220/1.5 |
| 3,044,656 | 7/1962 | Combs | 220/1.5 |
| 3,062,402 | 11/1962 | Farrell | 220/71 |
| 3,080,096 | 3/1963 | Carfizzi | 220/1.5 |
| 3,085,707 | 4/1963 | Tantlinger | 220/1.5 |
| 3,456,829 | 7/1969 | Classmeyer | 220/1.5 |

Primary Examiner—George E. Lowrance

[57] ABSTRACT

A frameless cargo-carrying container or trailer body construction, in which at least the side walls of the container or trailer body and one or both end walls each consists essentially of a unitary aluminum alloy plate having a thickness of at least about 5/32", and preferably having a tensile yield point of at least about 25,000 p.s.i. In a preferred form of the invention at least a majority of the major structural elements of the container or trailer body are formed of suitable aluminum alloys, and in one embodiment thereof, the container or trailer body includes forged aluminum alloy corner fittings, said alloy having an average percentage elongation of at least about 15%. The overall design of containers or trailer bodies of this invention is preferably such that the inner face of each side is substantially coplanar with the plate forming that side.

33 Claims, 18 Drawing Figures

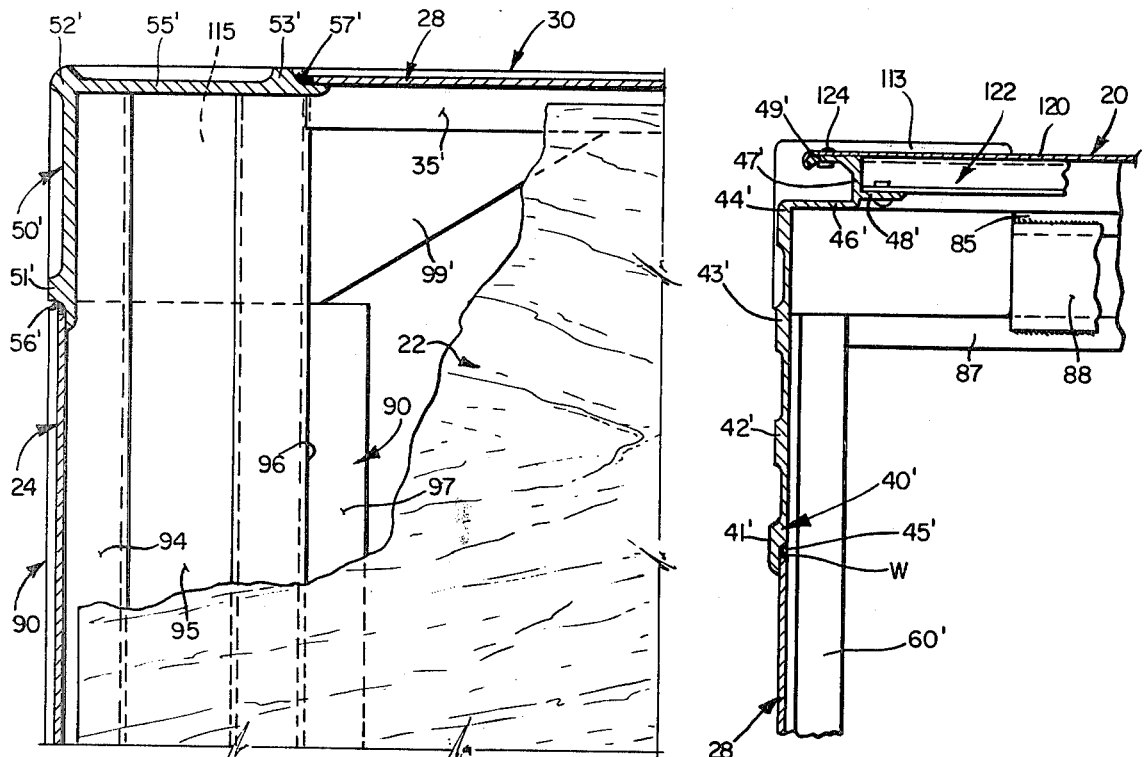
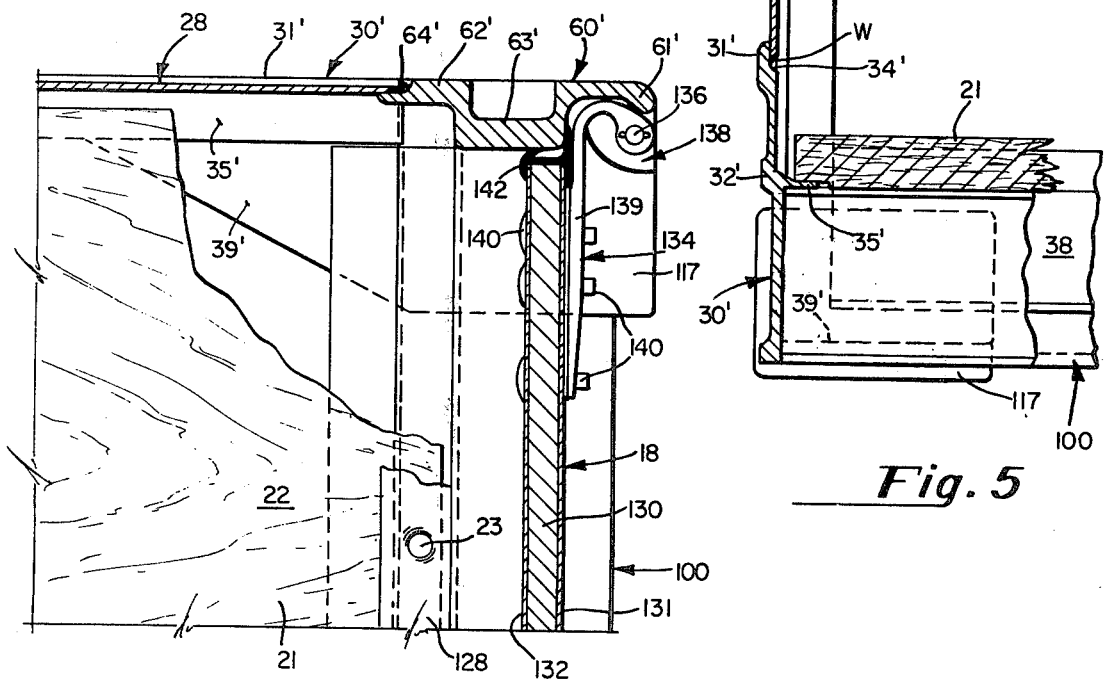

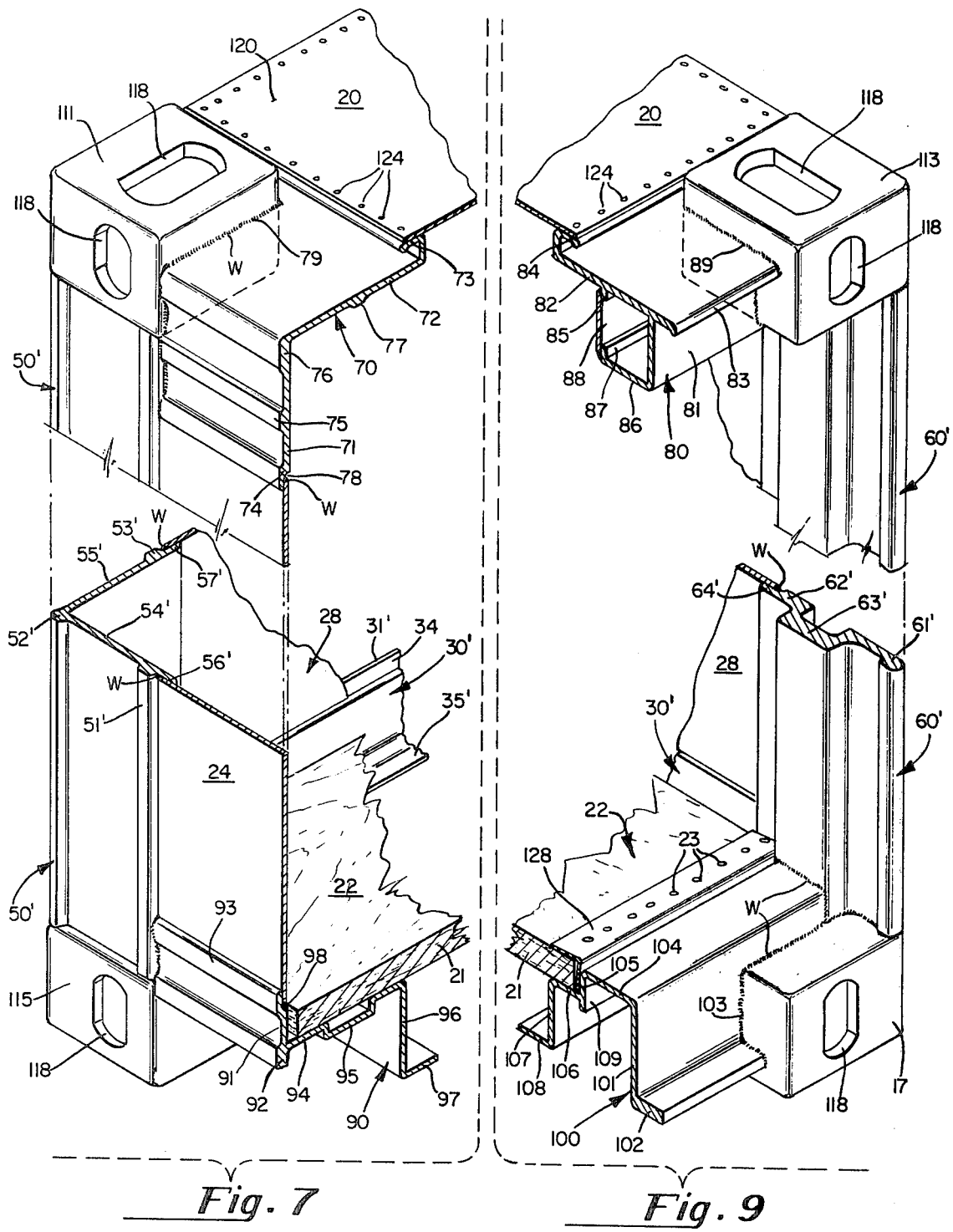

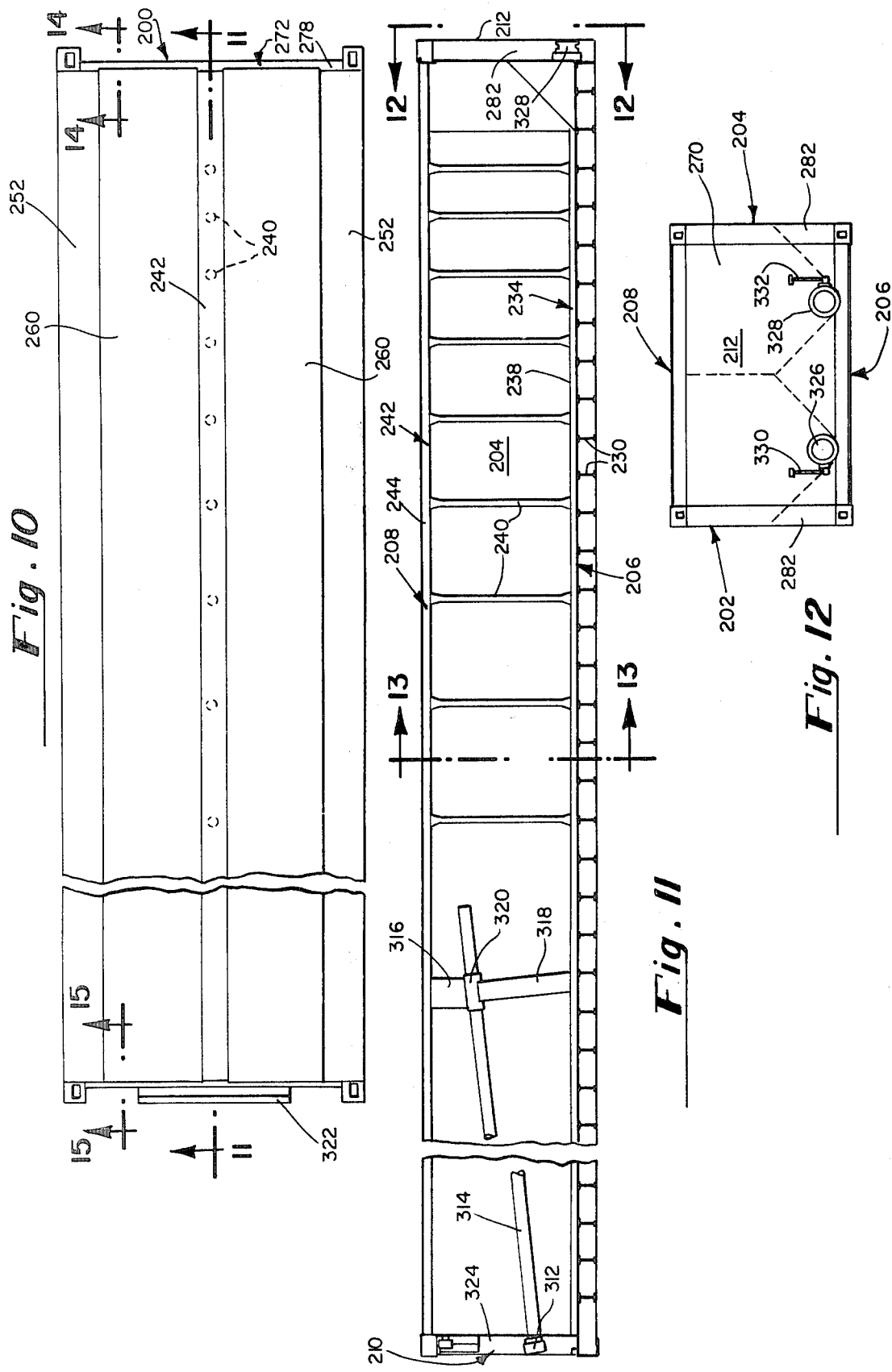

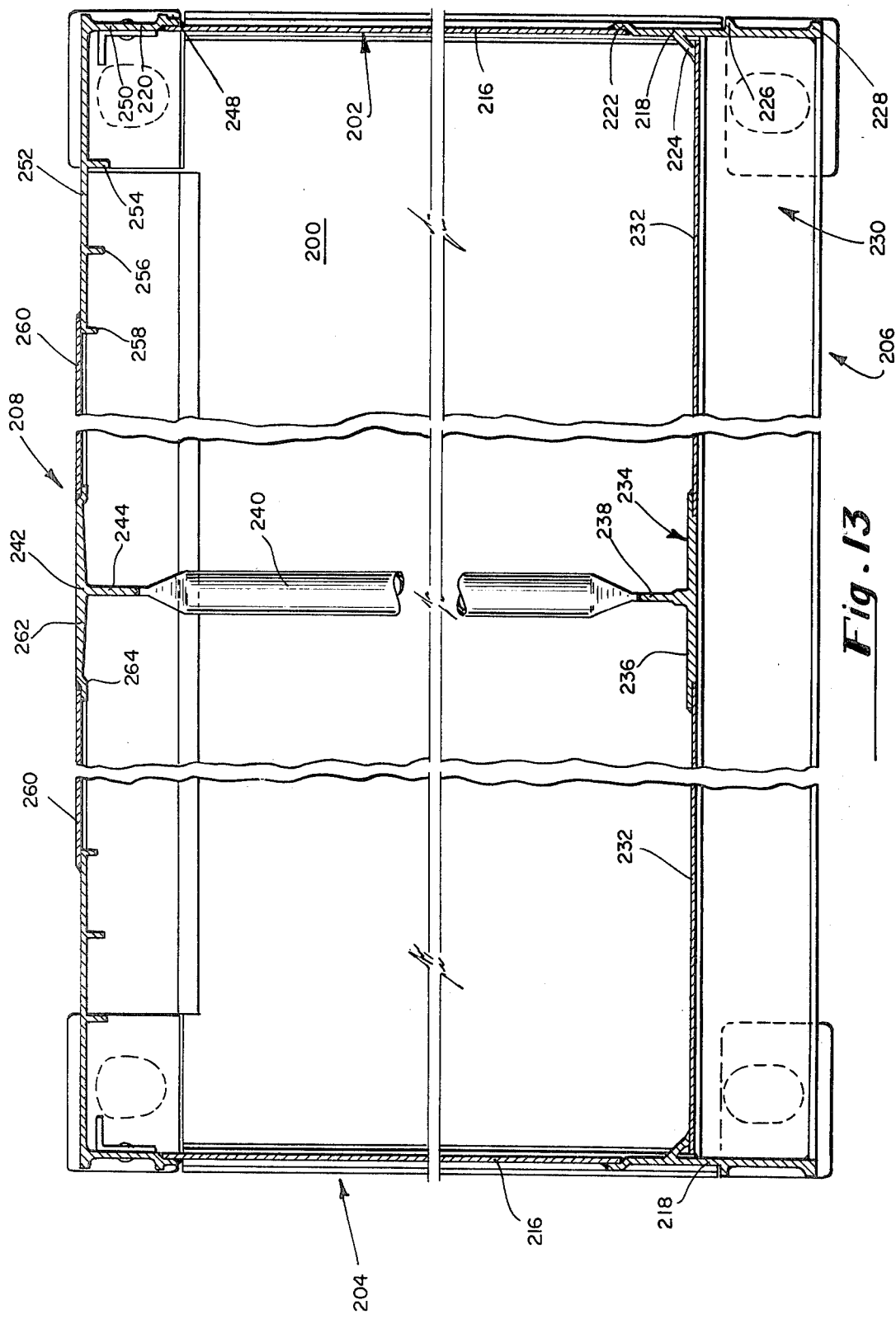

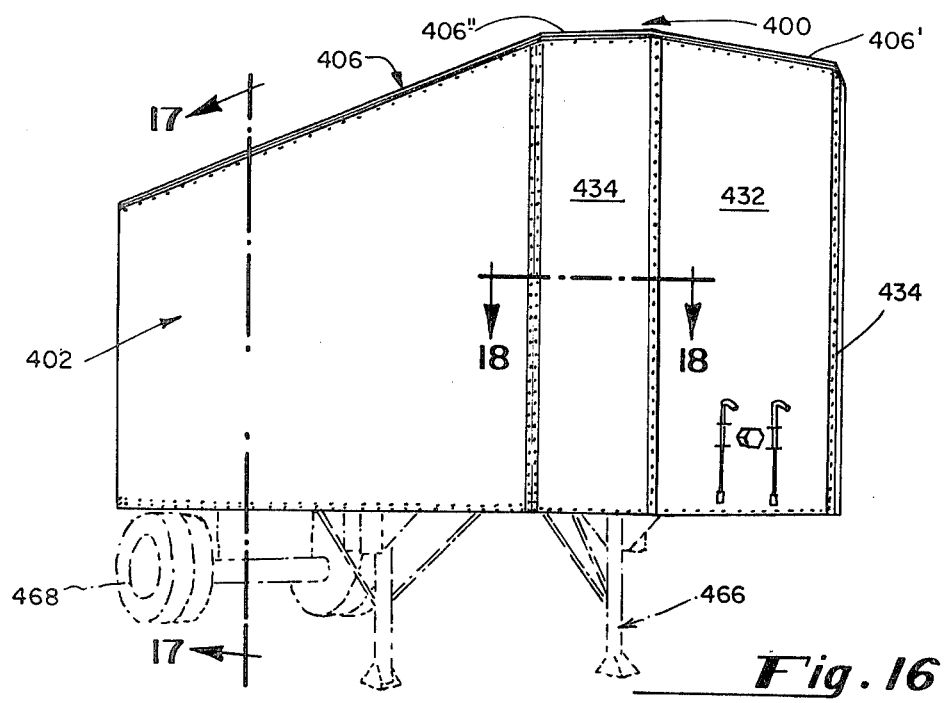
Fig. 16
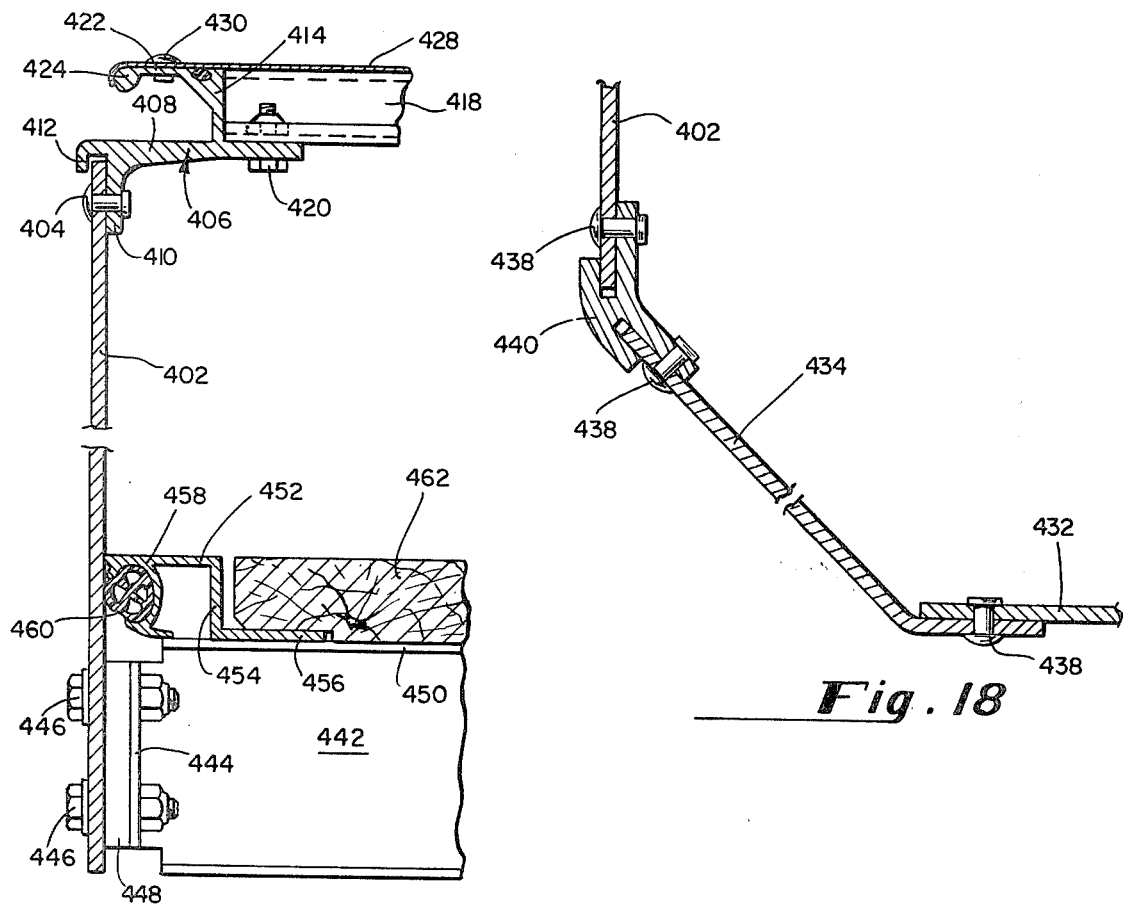
Fig. 17
Fig. 18

ALUMINUM PANEL CONTAINER OR TRAILER BODY

REFERENCE TO RELATED CASE

This is a continuation-in-part of U.S. Pat. application Ser. No. 868,772 filed Oct. 23, 1969, abandoned.

BACKGROUND OF THE INVENTION

1. Field of the Invention

The instant invention relates to the construction of frameless cargo-carrying containers and trailer bodies, of the sort which are adapted to be suitably hauled by tractor units.

The term, "container," as used herein, designates a closed, hollow structure of substantially rectangular or square cross-section having a length of at least about ten feet, a width of at least about eight feet and a height of at least about four feet. In one embodiment of the invention, a "container" may be mounted on a frame, supported by one or more bogies, and transported by being suitably connected to a tractor unit. A bulk cargo "container" may be filled with a pourable bulk cargo, such as grain or plastic beads, shipped on a suitable vessel, and discharged at its port of destination. "Containers" may be transported, in stacked relationship, in the hold or on a deck of a ship, on railroad cars, such as flat-bed cars, or like well-known means.

The term, "trailer body," as used herein, designates a closed hollow storage unit of substantially rectangular or square cross-section, having a length of at least about twenty feet, a width of at least about eight feet, and a height of at least about eight feet, and which includes integral fittings at the base thereof to which running gear, landing gear, and king pin are fastened. A "trailer body" is adapted to be hauled over-the-road, by a tractor unit and is not usually used to transport cargo by ship or by rail, except as an entire unit with bogies attached.

As used herein, the term, "frameless," designates a container or trailer body in which a substantial portion, at least about 67 percent, and preferably at least about 75 percent, of the load caused by the presence of cargo in the container or trailer body and created by dynamic forces during operation of vehicle is borne by the sides of the container or trailer body. Thus, the walls of a "frameless" container or trailer body are capable of safely withstanding stresses in the range from about 15,000 p.s.i. to about 25,000 p.s.i., which stresses are caused by the weight of the cargo in the container or trailer body, and by the dynamic forces initiated by the operation of the vehicle.

2. The State of the Art

Aluminum has been used, for many purposes, as a material of choice in the manufacture of cargo-carrying containers and trailer bodies, for some period of time. The manner in which aluminum has been used, in the formation of the side and end panels of trailer bodies or containers, was to incorporate a plurality of individual aluminum sheets having dimensions which typically were two feet by nine feet, into each of the sides and the end, and to mount the individual aluminum sheets of each side or end, at their interfaces, to aluminum or steel structural stiffener members, which are typically hat-shaped channels.

Unitary plywood panels, coated on either face with fiberglass-reinforced polyester, have been used as side panels and as end panels in cargo-carrying containers and trailer bodies, in conjunction with aluminum structural members. These aluminum structural members include channels to which the edges of the fiberglass-reinforced plywood panels are secured by bolts.

It is desirable to be able to fabricate an all aluminum alloy or mostly aluminum alloy cargo-carrying container or trailer body, in order to overcome some of the shortcomings of the foregoing prior art constructions.

The frameless aluminum or steel stiffener-reinforced aluminum side panel container and trailer body constructions of the prior art are easily damaged and their joints, where the aluminum sheets are fastened to the stiffeners, may be loosened whereby expensive maintenance is required. The aluminum or steel stiffeners of these units decreases the interior, cargo-carrying volume of the container, for any specific size of container having given exterior volume, because of the internal space occupied by the stiffeners. Such reinforced units are quite heavy when the stiffeners are made of steel, a factor contributing to additional tire wear and tractor engine wear, and reducing profitable payload by limiting the amount of payload that can be transported by truck, sea or rail since the gross weight (gross weight including the weight of cargo and the weight of the cargo-carrying unit) of any loaded container or trailer body is limited.

The shortcomings of the prior art frameless fiberglass reinforced-plywood side panel and end panel container and trailer body units have been the substantial weight of these units; the difficulty of fabricating such units, because of the inability to weld fiberglass reinforced-plywood panels to the support channels; the loss of inner volume due to panel thickness and the need for channels and bolts or rivets to join the panels to the support members; the deterioration of the plywood panels due to coating imperfections; and natural organic deterioration of the wood.

The instant invention overcomes the foregoing shortcomings of the prior art by providing an aluminum alloy frameless cargo-carrying container or trailer body construction, formed of unitary aluminum alloy plate side panels and end panel having a thickness of at least 5/32" and tensile yield strength of at least 25,000 p.s.i., thereby providing a noncorrosive and therefore long-lived, substantially maintenance free, frameless container or trailer body construction which has increased interior cargo-carrying volume for a given exterior volume; is relatively light in weight per square foot of available floor space; resists damage due to abuse; has a high scrap value; does not need painting; and is relatively economical to fabricate.

BRIEF SUMMARY OF THE INVENTION

The instant invention comprises a frameless cargo-carrying container or trailer body construction, wherein the sides and preferably at least one end of the trailer body or container are each constructed with a single aluminum alloy plate having a thickness of at least about 5/32", and tensile yield point of at least about 25,000 p.s.i., and most preferably about 30,000 p.s.i. to about 40,000 p.s.i. The supporting structural elements of the frameless container or trailer body, which may include top and bottom rails, headers and sills, are preferably formed of extruded aluminum alloy having a tensile yield point of at least 35,000 p.s.i. In a preferred embodiment of the invention as applied to a container, the corner posts have tensile yield points of at least about 42,000 p.s.i.

Another aspect of the invention is the specific configurations of the structural members, which provide substantial structural reinforcement in those areas which are normally subjected to substantial impact, are convenient to fabricate and assemble, and at minimum cost, and which are so designed as not to decrease the available storage volume of the container or trailer body. In the most preferred embodiment of this invention, the container or trailer body includes forged aluminum alloy corner fittings, said alloy having an average percentage elongation of at least about 12%, having substantialy ductility, and having a tensile yield point of at least about 40,000 p.s.i.

The high percentage elongation is an essential characteristic of the preferred corner fitting, because it provides a margin of safety prior to failure of the corner fitting under excessive stress, partially relieving such stress and also providing a visual indication of potential failure of the fitting.

The foregoing characteristics of the various aluminum alloy components of the invention combine to provide an all or substantially all aluminum alloy frameless cargo-carrying container or trailer body which has superior performance characteristics and long-term economy in comparison to the prior art units.

It is to be noted that, although this invention can be used in an all aluminum alloy frameless container or trailer body, in some instances it will be desirable to use steel for certain parts of the unit, in conjunction with the aluminum alloy members.

OBJECTS OF THE INVENTION

It is, therefore, a primary object of this invention to provide a frameless cargo-carrying container or trailer body, the side walls and preferably at least one end wall of which are each formed of aluminum alloy plate.

It is another object of this invention to provide a frameless cargo-carrying container or trailer body construction in which the side walls and preferably one end wall are each constructed with a single aluminum alloy plate, and in which the remaining structural members of the container or trailer body consist of a majority of aluminum members.

Yet another object of this invention is to provide a frameless cargo-carrying container or trailer body construction in which the inner faces of the side walls and at least one end wall are unobstructed and planar.

A still further object of this invention is to provide an aluminum alloy frameless cargo-carrying container or trailer body construction including aluminum alloy forged corner fittings, said alloy having an average percentage elongation of at least about 15%.

A concomitant object of this invention is to provide a frameless cargo-carrying container or trailer body construction wherein each of the side walls is constructed with a single aluminum alloy plate having a thickness of at least 5/32" and a minimum tensile yield point of about 25,000 p.s.i., and in which the side walls bear a substantial portion, on the order of at least about sixty-seven percent, of the load of cargo contained in the container or trailer body.

DESCRIPTION OF THE DRAWINGS

FIG. 5 is a fragmentary, partial cross-sectional view of a cargo-carrying container, taken along line 5—5 of FIG. 4;

FIG. 6 is a fragmentary cross-sectional view of a cargo-carrying container, partially broken away, taken along line 6—6 of FIG. 4;

FIG. 7 is a fragmentary perspective view of the front end of a cargo-carrying container, partially in section and partially broken away;

FIG. 8 is a cross-sectional view of a cargo-carrying container, taken along line 8—8 of FIG. 4;

FIG. 9 is a fragmentary perspective view, partially in section and partially broken away, of a rear corner of a cargo-carrying container, with the hinge assembly for the rear door removed;

FIG. 10 is a top plan view of a frameless bulk cargo-carrying container, another embodiment of this invention;

FIG. 11 is a cross-sectional view of the bulk cargo-carrying container of FIG. 10, taken along line 11—11 of FIG. 10;

FIG. 12 is an end view of the bulk cargo-carrying container, taken along the line 12—12 of FIG. 11;

FIG. 13 is a partial cross-sectional view of the bulk cargo-carrying container, taken along line 13—13 of FIG. 11;

FIG. 16 is a perspective view, partly in phantom, of a frameless trailer body, another embodiment of this invention;

FIG. 17 is a partial cross-sectional view of the trailer body of FIG. 16, taken along line 17—17 of FIG. 16; and FIG. 18 is a partial cross-sectional view of the trailer body of FIG. 16, taken along line 18—18 of FIG. 16.

DETAILED DESCRIPTION OF THE INVENTION

The most preferred embodiment of the invention, illustrated in FIGS. 1 to 9 inclusive, is directed to a frameless cargo-carrying container, generally designated by numeral 10. Frameless cargo-carrying containers are well known in the art, and are designed to be transported by various transportation means, such as by rail, sea and truck. These containers are adapted to be fastened on a suitable under-frame, which under-frame typically incorporates a king-pin, landing gear, and running gear, and which may be hauled over the road by a tractor unit when the under-frame is attached. U.S. Pat. No. 3,317,219 illustrates the general details of one type of coupleable, frameless cargo-carrying container construction, and the cooperating under-frame, and the manner of use thereof. These cargo-carrying containers may be stacked several high, such as in the hold of a ship, usually after they have been removed from the under-frames. It is to be understood throughout the description of the instant invention, that although a frameless cargo-carrying container is illustrated as the preferred embodiment of the invention, the basic principles of the invention are also applicable to incorporation into a frameless bulk cargo-carrying container or a frameless trailer body, as hereinafter described. The primary difference between a cargo-carrying container and a trailer body is that the trailer body includes, as an integral part of the trailer body, a king-pin and landing gear, and hardware for attaching the running gear, which render the trailer body capable of being hauled by a tractor without the use of a separate under-frame containing the king-pin, landing gear, and running gear.

There are several types of frameless cargo-carrying containers, including those which are coupleable in tandem, as shown in U.S. Pat. No. 3,317,219, and those which are not intended to be coupleable in tandem. These types of containers have differently shaped corner fittings and are all within the purview of this invention.

The instant invention is directed to the so-called "frameless" constructions of cargo-carrying containers and trailer bodies wherein a substantial portion, on the order of at least about sixty-seven percent, and preferably at least seventy-five percent, of the load due to cargo carried within the container or trailer body and created by dynamic forces during operation of the vehicle, is borne by the side and preferably also the end panels of the unit, so that the side and end panels perform a substantial load-bearing function, in addition to functioning as a protective cover for the cargo.

Figure 1:
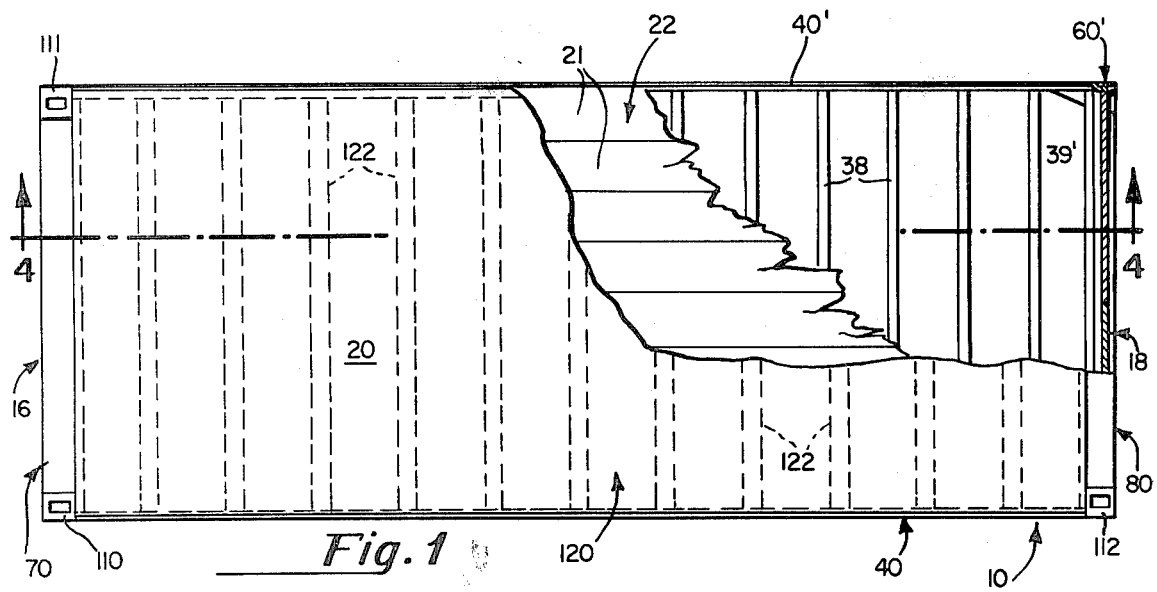
FIG. 1 is a top plan view of a frameless cargo-carrying container of the instant invention, with a portion of the roof and floor partially broken away.
Figure 2:
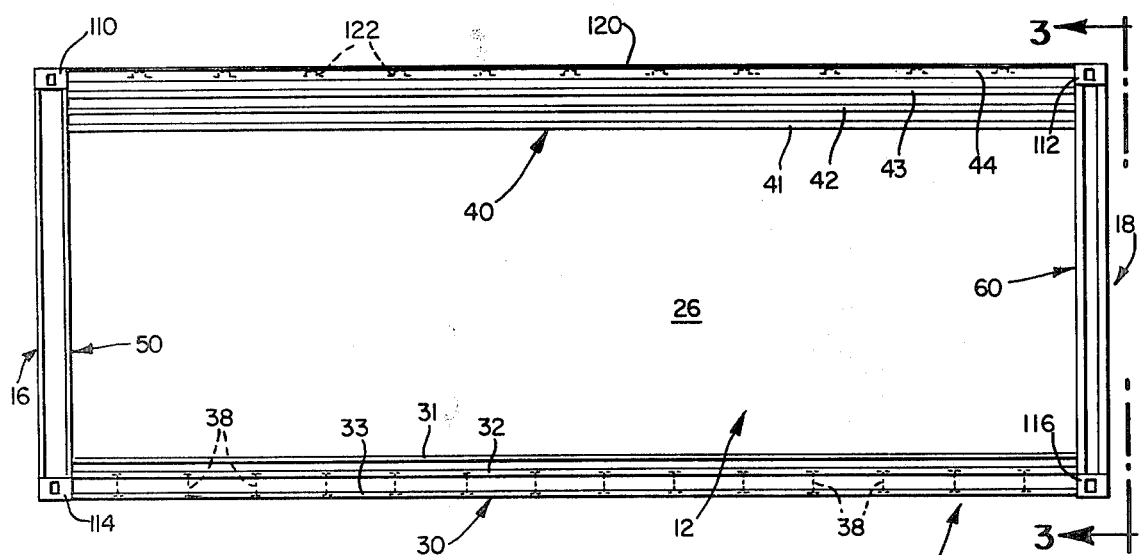
FIG. 2 is a side elevational view of the cargo-carrying container of FIG. 1.

Viewing FIGS. 1 and 2, container 10 is seen to comprise a front side 12, an opposing rear side 14, a front end 16, a rear door 18, a roof 20, and a floor 22. Mounted in the eight corners of container 10 are corner fittings 110, 111, 112, 113, 114, 115, 116 and 117. The purpose of the lower corner fittings, which will be more fully described hereinafter, is to permit the container to be vertically secured in a stack, to be fastened to a suitable frame or to be fastened to the floor of a railroad car or a ship's deck. The apertures in the corner fittings also allow certain well-known types of gripping means to engage the fittings. The upper fittings also are used for vertical stacking of containers and to receive gripping means to engage the fittings. Such gripping means, which may be lifting hooks, shackles or lugs, which are fastened to suitable lifting devices, in a manner well known in the art, are used for loading the containers onto or from a ship or railroad freight car.

Viewing FIG. 2, side 12 of container 10 is seen to comprise an elongated, unitary, rolled, aluminum alloy plate side panel 26, which is fastened at its lower end to an extruded, aluminum alloy bottom rail 30, is fastened at its upper end to an extruded, aluminum alloy top rail 40, is fastened at its forward end to an extruded, aluminum alloy front corner post 50, and is fastened at its rear end to an extruded aluminum alloy rear corner post 60. The opposite side 14 of the container is similarly comprised of a rolled aluminum alloy plate side panel 28, respectively secured along its four sides to extruded aluminum alloy bottom rail 30', extruded aluminum alloy top rail 40', extruded aluminum alloy front corner post 50', and extruded aluminum alloy rear corner post 60'. It is to be noted that, throughout this patent, the counterparts, on side 14 of the container 10, of the bottom rail 30, top rail 40, front corner post 50, and rear corner post 60, and the various elements of these counterparts are designated by primes.

Figure 4:
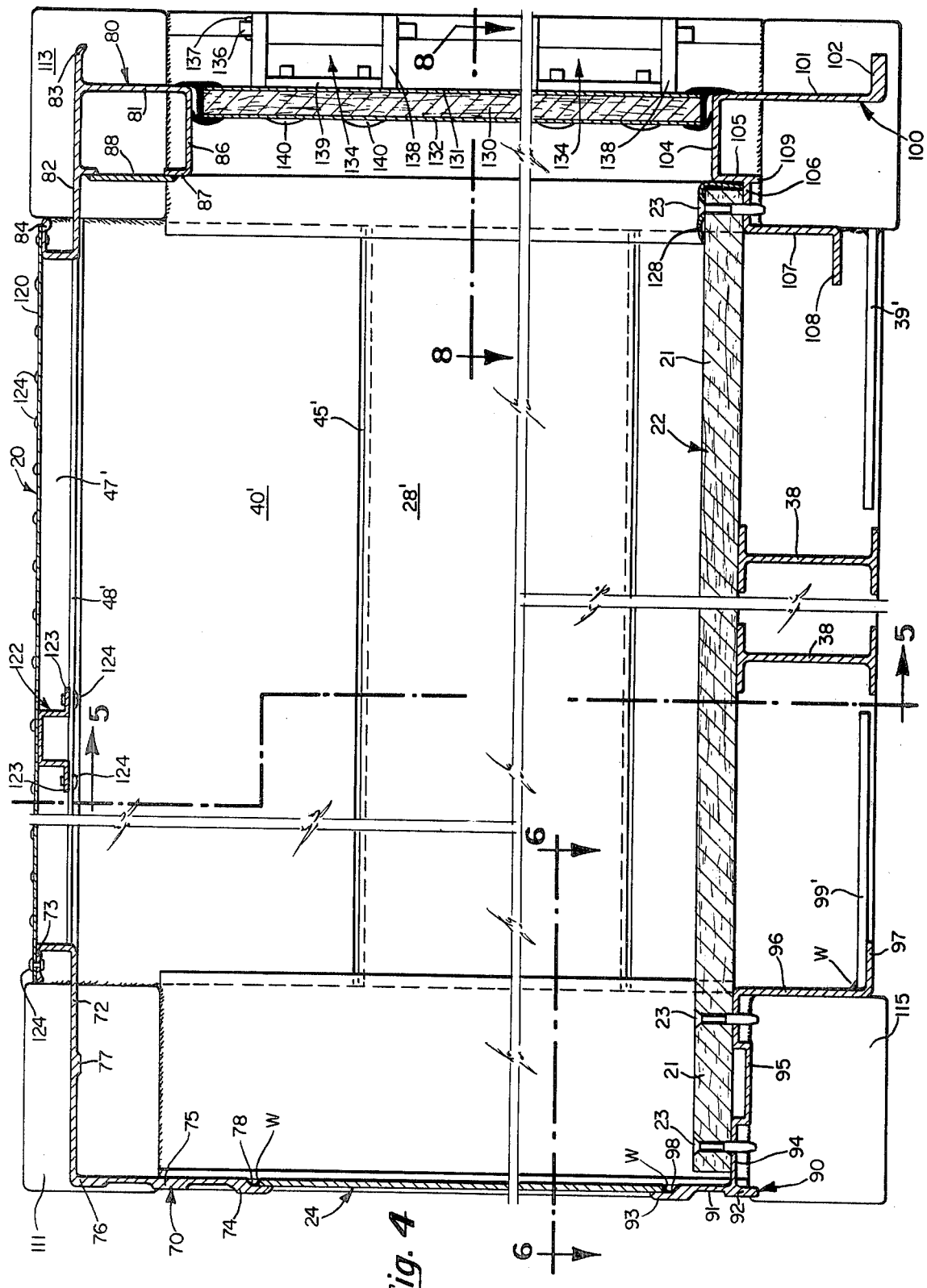
FIG. 4 is a fragmentary cross-sectional view along the length of a cargo-carrying container, taken along line 4—4 of FIG. 1.

As seen in FIGS. 4 and 7, the front end section 16 of the container comprises a rolled aluminum alloy plate front panel 24, fastened at its lower end to extruded aluminum alloy front sill 90, at its upper end to extruded aluminum alloy front header 70, and at its opposing sides to respective extruded aluminum alloy corner posts 50 and 50'.

Figure 3:
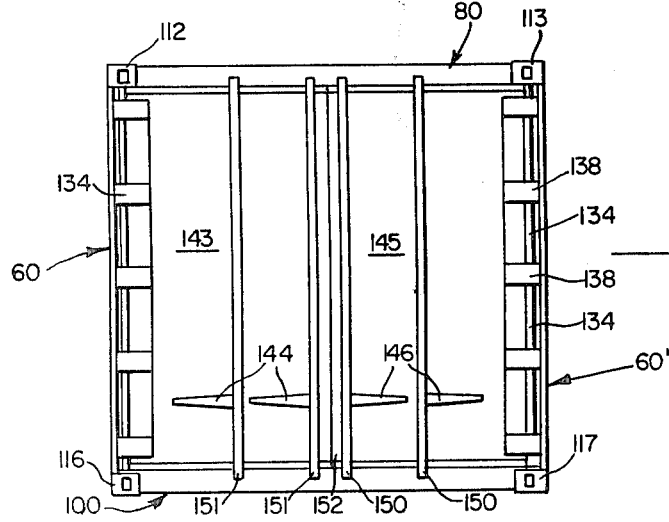
FIG. 3 is an end view of the rear end of a cargo-carrying container, taken along line 3—3 of FIG. 2.

As can be seen in FIG. 3, rear door 18 comprises two sections, respectively designated 143 and 145, which door sections are respectively mounted by hinge strap assembles 134 to respective rear corner posts 60 and 60'. Extruded aluminum alloy rear header 80 and extruded aluminum alloy rear sill 100, which form part of the basic container skeleton assembly, may also be seen in FIG. 3.

As seen in FIGS. 1 and 5, the roof 20 of the container is formed of an aluminum alloy roof sheet 120 which is fastened, as by rivets 124, to the top rails 40 and 40', and to the front header 70 and rear header 80. Extruded aluminum alloy roof members 122 are fastened at their ends to respective top rails 40 and 40', and are adhesively secured to the roof sheet 120.

A multiplicity of extruded aluminum alloy I-beams 38 extend between bottom rails 30 and 30', to which they are fastened. The I-beams 38 function as the primary support for wood floor 22, which lays across the I-beams, as seen in FIG. 1. The I-beams also support any cargo handling equipment, such as a fork truck. Therefore, the I-beams must have substantial structural strength, and transfer the load to the side panels at their ends. Similarly, the cargo load, after the container is loaded, is borne by the sides of the container, and preferably also by at least one end.

In a preferred embodiment of the invention, the overall external dimensions of the container 10 are about twenty feet in length, about eight feet in width, and about eight feet in height. These are preferred dimensions, and can be considerably varied to suit the particular size characteristics desired in a given container. In an embodiment of the foregoing overall dimensions, side panels 26 and 28 will each preferably have dimensions of about eighteen and one-half feet in length, and about six feet, three inches in height. Front panel 24 will, in the preferred embodiment, have dimensions of about six feet, seven inches in height and about six feet, ten inches in width.

The three panels, 24, 26 and 28 are each preferably formed of 3/16 inch rolled aluminum alloy plate, and the alloy of choice for these plates is aluminum alloy 5086-H34, an alloy of aluminum with silicon, copper, iron, manganese, magnesium, chromium and zinc, having a minimum tensile yield point of about 34,000 p.s.i. In selecting the material for the plates 24, 26 and 28, the most important characteristics of the material of choice are a minimum plate thickness of about 5/32", and a preferred minimum tensile yield point of about 25,000 p.s.i. and weldability. Alloy 5086-H34 is ideally suited for this purpose, because of its desirable characteristics of strength, weight, cost, and weldability. Gussets 99, 99', 39 and 39' are preferably rolled plates of alloy 5086-H34. It will be appreciated that other aluminum alloys having comparable characteristics can be substituted for 5086-H34, and that thicker panels can be used having a lower minimum tensile yield point than about 25,000 p.s.i., if the overall strength of the plate is comparable to that of the disclosed 3/16" plate of 5086-H34 alloy.

The corner fittings 110, 111, 112, 113, 114, 115, 116 and 117 are preferably forged from aluminum alloy designated as 7005-T63. This alloy is a proprietary alloy of Alcoa, whose primary ingredients are aluminum, zinc and magnesium. The corner posts 50, 50', 60 and 60' are preferably extrusions of alloy 7005-T53, in order to obtain a good weld when the corner fittings are welded to the corner posts; however, other aluminum alloys could also be used as the material for the corner posts. The most important characteristics of a suitable alloy for the corner fittings are strength, percentage elongation and forgeability. It is also important that the material of the corner fittings—and consequently of the corner posts, as well—have a high ductility as well as a minimum tensile yield point of about 42,000 p.s.i. The alloy of the corner fittings should have an average percentage elongation of at least 12%, and this property is provided by the 7005-T63 alloy. The reason for desiring an alloy having such a high percentage elongation, as well as good ductility, is to allow an additional margin of safety in the corner fitting in the event of overloading or mishandling approaching the point of yield. With a high ductility and percent elongation, a fitting which is subject to stress at about its yield point will elongate somewhat, relieving the stress in part, and the fitting will not fail. The elongated fitting will also provide a visual indication of overloading. Therefore, if the container is being handled by suitable hooks and slings or other handling equipment, the likelihood that the corner fitting will fail and the container will be upset or fall is considerably diminished. Another desirable characteristic of the 7005-T63 alloy, which makes it preferable to other alloys of comparable physical properties, is that it can be welded, and has good after-weld strength, without requiring heat treatment.

The remaining structural members of the container, namely front header 70, rear header 80, front sill 90, rear sill 100, bottom rails 30 and 30', top rails 40 and 40', I-beams 38, and roof members 122, are preferably extrusions of aluminum alloy 6061-T6. This alloy has a minimum tensile yield point of 35,000 p.s.i., is economical and readily weldable, and the particular alloy identified above was chosen for these characteristics. The roof panel 120 is formed of a 0.050 inch sheet of aluminum alloy designated 3003-H16, which is chosen for its durability and economy.

Viewing FIG. 7, it will be seen that front sill 90 comprises a vertical outer section 91, a horizontal web section 94, a vertical foot section 96, and a horizontal flange 97. Front face 91 of front sill 90 includes a pair of increased width reinforcing ribs 92 and 93. A recessed shoulder 98 formed in the rear upper edge of front sill 90 provides a seat for the lower edge of end plate 24, so that the inner face of section 91 is coplanar with the inner face of end plate 24; the front sill is fastened to the end plate by aluminum weld seam W. Web 94 contains a recessed portion 95, the purpose of which is to facilitate alignment of the corner fitting. The non-recessed portion of web 94 contains two rows of aligned apertures for receiving the ends of the self-tapping steel screws 23, with which the wood panels 21 of floor 22 are fastened to the front sill, as seen in FIG. 4.

Corner gusset 99' has one end welded as by continuous weld W to the front corner fitting 115, the other face of the gusset being welded as by a continuous weld (not shown) to the inner face of bottom rail 30', in the manner shown in FIG. 5 with respect to gusset 39'. A corresponding gusset 99 is fastened proximate the opposite end of front sill 90 to front corner fitting 114 along one edge and is fastened along a second edge to the inner end of bottom rail 30, preferably by welding. Gussets 99 and 99', as well as gussets 39 and 39' are preferably plates of the same aluminum alloy as the side panels, because of the good shear strength of this material. The purpose of gussets 99, 99' 39 and 39' is to transmit restraint loads from the bottom fittings to the structural members of the container, when the container is mounted on a railroad car or ship's deck through connectors secured to the corner fittings.

Viewing FIGS. 4 and 7, front header 70 is seen to comprise a vertical section 71, a horizontal section 77, and a reverse flange section 73. Front section 71 has three reinforcing ribs 74, 75 and 76, and horizontal section 72 has reinforcing rib 77 formed therein. At the lower edge of vertical section 71, a shoulder 78 is formed, receiving the upper edge of end plate 24, which is fastened to the shoulder, as by a continuous weld W, so that the inner face of panel 24 is coplanar with the inner face of section 71 of the header 70. Each of the opposite ends of the front header 70 has a cut out section 79, for the purpose of receiving the respective corner fittings 110 and 111, which are secured to the front header 70 by a continuous weld W. The leading edge of roof panel 120 is fastened to flange 73 of front header 70 by a mutiplicity of spaced aluminum rivets 124.

As seen in FIG. 7, corner post 50' comprises a front section 54' and a side section 55', and reinforcing ribs 51', 52', and 53'. The outer edges of corner posts 50' respectively define shoulders 56' and 57' for the purpose of receiving respective sides of end plate 24 and side plate 28, which are fastened to the shoulders 56' and 57' by continuous weld seams W. In the same manner, corner post 50 has respective shoulders 56 and 57, to which the corresponding sides of end plate 24 and end plate 26 are fastened, such as by a continuous weld seam. The opposing ends of each of corner post 50 and corner post 50' are welded to the corresponding corner fittings 110, 114, 111, and 115. As can be seen in FIG. 7, the corner fittings, which are hollow, have slots 118 formed on three faces thereof, communicating with the interior cavity of the fitting. The purpose of the slots 118 is to permit coupling of adjacent containers to form a tandem unit, to couple a container to a frame, the bed of a railroad car, or a ship's deck, to couple containers in a vertical stack, and to permit lifting hooks or the like to attach to the container for handling by a suitable crane. The specific shapes of the corner fittings and the slots therein are well known in the art, and form no part of this invention.

Viewing FIG. 9, rear header 80 is seen to comprise a horizontal body section 82, a vertical section 81, a second horizontal section 86, an upstanding lip 87, and a flange section 84. Horizontal section 82 has a front edge portion 83 which extends beyond vertical channel section 81, and a lip 85 depends from the horizontal channel section 82. The purpose of edge portion 83 is to allow rain draining from the roof 20 to cascade down away from door 18, to avoid leakage into the container. At each of the opposite ends of rear header 80, a recessed section 89 seats the respective corner fittings 112 and 113, which are fastened to the rear header, as by welding. The upper ends of corner posts 60 and 60' are likewise fastened to the corresponding corner fittings 112 and 113, as by welding. A closure plate 88 closes the open end of the channel formed by header sections 81, 82 and 86 at the outer ends, by being welded to header lip members 85 and 87. The purpose of closure plate 88 is to increase the strength of header 80. The closure plate 88 is an extrusion of an aluminum alloy, preferably the same aluminum alloy as the rear header 80. The rear end of roof panel 120 is fastened to flange 84 of rear header 80 by a plurality of aluminum rivets 124.

Viewing FIG. 9, corner post 60' is seen to have a central, recessed well section 63', reinforcing ribs 61' and 62', and a shoulder 64' formed at its inner edge, and against which an edge of side panel 28 is seated, and is fastened by weld seam W. As has been noted, the opposing ends of corner post 60', and of its counterpart corner post 60, are welded to the corresponding pairs of corner fittings 113 and 117, and 112 and 116. Corner post 60 has a configuration which is allochiral to corner post 60', and the shoulder 64 of corner post 60 has side plate 26 welded thereto by a suitable continuous weld. As has been noted, the corner posts are preferably extrusions of the same alloy as the fittings, primarily because of ease of welding of the posts to the fittings, and also because alloy 7005-T53 has the high compressive strength which is important for a corner post.

One edge of corner gusset 39' is welded to corner fitting 117. The other edge of the corner gusset 39' is welded to the inside of bottom rail 30'. In like manner, gusset 39 is welded to the opposite corner fitting 116 and to bottom rail 30.

Rear sill 100 is seen to comprise vertical section 101, having rearwardly extending horizontal bumper 102 and horizontal section 104. The inner face of rear sill 100 comprises a stepped channel 105, 106, 107, and 108. The ledge 106 of the rear sill supports one end of each of the panels 21 which constitute the floor 22, and the panels are fastened to ledge 106, through suitable apertures, with self-tapping steel screws 23 which also fasten extruded aluminum angle member 128 to the floor, The purpose of angle member 128 is to protect the otherwise exposed ends of the floor panels 21, from damage during loading and unloading of the container. Rear sill 100 is seen to include a dependent lip section 109, the purpose of which is to facilitate positioning the corner fittings 116 and 117 at the ends of the sill, and to contribute rigidity and strength to the sill. Each of the ends of the sill has a cut out section 103, adapted to receive the corresponding corner fittings 116 and 117, which are suitably fastened to the sill, as by weld seams W.

Viewing FIGS. 3, 4, and 8, the rear door 18 is seen to constitute two separate door members, 143 and 145. Each of the doors is a hingedly mounted panel of so-called "ply-metal", which constitutes a one-inch thick sandwich of a plywood sheet 130 between outer face sheets 131 and 132 of aluminum alloy. The hinge members 138 are fastened, as by welding, to the respective corner posts 60 and 60', and the hinge strap assemblies 134 are rotatably fastened to the hinge members 138 by means of stainless steel pins 136, which have tack welds 137 at the opposite ends thereof, to prevent the pins from falling through. The hinge strap connecting sections 139 are suitably apertured, as are the door panels 143 and 145, so that truss head huck bolts 140 fasten the respective hinge strap assemblies to the respective door panels. Door unit 18 is preferably an anti-rack door, of a construction which is well known in the art, and does not form part of this invention. However, there are schematically illustrated the locking bars 150 and 151 and their operating handles 144 and 146, which connect the respective door sections to the rear header and sill, and the central closure section 152. It will be appreciated that, in lieu of the "ply-metal" panels of which the door members are formed, non-laminated aluminum panels could be substituted.

Viewing FIG. 5, bottom rail 30' is seen to constitute an elongated member having three reinforcing ribs 31', 32', and 33'. On the inner face of bottom rail 30' is an inwardly extending ledge member 35', the purpose of which is to serve as a seal and to provide vertical support to the outer edges of the floor panels 21 of the floor 22. Extending across container 10, and uniformly spaced along its length are a multiplicity of transversely extending extruded aluminum alloy I-beams 38. The I-beams are each located immediately below and in contact with lip 35' of bottom rail 30' at one end, and counterpart lip 35 of bottom rail 30 at the other end. The lower edges of the I-beams 38 are in alignment of the lower edges of the bottom rails 30 and 30', such as seen in FIG. 5. The ends of the I-beams are fastened to the inner faces of bottom rails 30 and 30', such as by continuous welds. The primary purpose of the I-beams is to support the substantial load of a fork truck or similar equipment during loading or unloading of container 10. Although I-beams are the preferred shapes for the beams 38, because of their high strength to weight ratio, other shapes of beams, such as Z-beams or channels, can be substituted for the I-beams. The upper edge of bottom rail 30' has a shoulder 34' formed at its inner face for the purpose of receiving the lower edge of side panel 28, which is fastened, as by a continuous weld W, to the shoulder. In the same manner, bottom rail 30 has reinforcing ribs 31, 32 and 33, ledge 35, and inner shoulder 34. Side panel 26 is fastened to inner shoulder 34 by welding. As seen in FIG. 5, the inner faces of rails 30' and 40' are coplanar with the inner face of side panel 28. Likewise, the inner face of side panel 26 is coplanar with the inner faces of rails 30 and 40. The opposite ends of bottom rail 30' are respectively welded to the adjacent sections of corner fittings 115 and 117, and the corresponding ends of bottom rail 30 are welded to the respective adjacent sections of corner fittings 114 and 116. The ends of the bottom rails 30 and 30' may also be welded to the adjacent sections of the corresponding corner posts.

Viewing FIG. 5, top rail 40' is seen to have stiffening ribs 41', 42', 43', and 44' formed thereon. At the upper edge of the top rail is a horizontal section 46' which is adjacent to vertical section 47'. Section 47' is adjacent to flange member 49' and horizontal lip 48'. Top rail 40' has a shoulder 45' formed at the inner face of its lower edge. The upper edge of side panel 28 is seated against shoulder 45' and fastened thereto by continuous weld W, corresponding shoulder 45 of top rail 40 seats side panel 26 which is fastened thereto by a continuous weld, in the same manner. The inner faces of the side panels are coplanar with the inner faces of their corresponding top rails. Fastened to lip 48' of top rail 40' are the flanges 123 of extruded aluminum alloy roof members 122, which are fastened by means of aluminum rivets 124. The opposite ends of the flanges of roof members 122 are similarly fastened to the lip 48 of top rail 40. The roof panel 120 is fastened at its side edges to flange 49' of top rail 40', and similarly to flange 49 of top rail 40, by means of aluminum rivets 124. In order to provide a tight fit of the roof panel 120 on the roof bows 122, the roof panel 120 is adhesively fastened to the upper surface of the roof members 122, utilizing a suitable adhesive, such as polysulfide rubber epoxy adhesives, which are well known in the art.

It is to be noted that the door members adjacent corner posts 60 and 60', rear header 80 and rear sill 100 have flexible, rubber or vinyl sealing strips 142 secured thereto, to provide a water tight protective seal at the edges of the doors.

The panels 21 of wood floor 22 are made of laminated oak, a well known material in the art for this purpose, although other materials, such as hickory, ash or aluminum plates, may also be used for the floor.

As can be seen in FIG. 5, virtually the entire interior of the container 10 between the corner posts is coplanar with the inner faces of the side panels 26 and 28, thereby increasing the available storage volume of the containers of this invention, in comparison with the prior art containers, which required interior reinforcing stiffeners. Also, the interior of the containers of this invention contain no inwardly protruding obstructions between the corner posts, which could damage cargo or restrict the interior freight-carrying capacity of the containers of this invention.

It is to be noted that the particular design of the skeletal members of the container 10, namely, the corner posts, the top and bottom rails, the front and rear headers, and the front and rear sills, are so chosen as to provide structural reinforcement of the container in those areas where reinforcement is desirable for the purpose of withstanding impact forces during handling of the container, for structurally stiffening the container, particularly to withstand the compressive force of stacking, and also to make the various skeletal members easier to extrude. It is also to be noted that these skeletal members are specifically designed to provide the maximum unobstructed interior volume of the cargo-carrying container, and to avoid possible protrusions which might damage cargo.

The various joints which have been disclosed above as being welded are preferably formed by continuous arc welding, a well known process for the continuous welding of aluminum structural members. The particular gas shield used to weld a seam will depend upon the specific alloys of which the members being welded are composed, and the choice of such appropriate gas shield can be made in accordance with manufacturers' recommendations. Although welding has been disclosed as the fastening technique of choice for certain members, other techniques such as riveting may be used. However, riveting will not provide a weatherproof seal, as continuous welding will, and rivets could also constitute protrusions in the container which might damage cargo.

It might be desired to modify the frameless cargo-carrying container disclosed to provide fork lift pockets at the lower edges of the opposite sides of the container. Such a modification can readily be accomplished, keeping in mind that the areas of the container adjacent the pockets should be structurally reinforced to accomodate the additional stresses caused by handling with a fork lift truck.

Although the preferred embodiment of the invention has one closed end and an access end with hinged doors, these features may be varied. For example, one or both ends of the container could be provided with overhead doors, in a manner which is well known in the art. If both ends are provided with doors, a pair of coupled containers could be loaded or unloaded, without uncoupling them, by opening both doors of one container and the proximate door of the other container.

Too, it might be desired to create a door in one or both side plates, in order to permit access to the container interior from one or both sides. Such a doorway could be formed in one of the side plates without excessively detracting from the strength of the side plate, so long as the doorway is not too large in relation to the area of the plate. However, the hangings and lock mechanisms for such a door would extend into the container and lessen the available storage volume of the container.

Although the container of the preferred embodiment of the invention has been described as including specifically shaped skeletal members, such as headers, sills, rails, corner posts, and corner fittings, the shapes of these members can be varied substantially, and in some instances the members can be omitted entirely. For example, the bottom rails 30 and 30', which protect the lower ends of plates 26 and 28 from damage and to which I-beams 38 are welded, could be considerably shortened vertically or removed, or one or more reinforcing ribs removed therefrom. If a trailer body is constructed in accordance with the principles of this invention, as disclosed hereinafter, the lower rails 30 and 30' could be eliminated entirely, and aluminum I-beams 38 could then be welded directly to the inner faces of plates 26 and 28.

It is to be noted that, with respect to the bulk cargo-carrying container 200 and trailer body 400, described hereinafter, the respective aluminum alloy side panels, corner posts, rails, sills, corner fittings, and end panels, have the same characteristics and dimensions as described above with respect to the corresponding elements of the container 10 (where corresponding elements exist).

Viewing FIGS. 10 through 15 inclusive, there is illustrated therein a frameless bulk cargo storage container, generally designated as 200. Container 200 is designed for use as a storage vessel for pourable, solid cargoes, such as grain or beads of polymeric material, such as polystyrene. In use, these materials are pumped into the container, and are discharged from the container by tilting the container with a frame or by the use of suitable grappling hooks or claws suspended by a boom and which grasp the container by the corner fittings, to permit the contents to pour out through the apertures in the discharge end of the container. These bulk commodity containers are usually transported on ships, railroad cars or by tractor trailers with the use of a special chassis.

A conventional bulk commodity container has a length of at least about twenty feet, a width of about eight feet and a height of about four feet or more.

Viewing FIGS. 10, 11 and 12, the bulk commodity container 200 is seen to comprise side walls 202 and 204, floor 206, roof 208, loading (front) end 210 and unloading (rear) end 212. Side walls 202 and 204 are identical, and one set of numerals will be used to designate the same parts on both of the side walls. Side wall 202 is seen to comprise an elongated aluminum alloy plate 216, which extends the entire distance of the side wall vertically between the bottom rail 218 and the roof corner extrusion 220 and horizontally between the corner posts 282, to which the panel is fastened, as by welding. Aluminum plate 216 has a thickness of at least about 5/32 of an inch and a tensile yield point of at least about 25,000 p.s.i. Plate 216 is preferably formed of 5086-H34 aluminum alloy, having a tensile yield point of approximately 34,000 p.s.i. The dimensions of the aluminum plate 216 are approximately thirty-nine feet in length by about four feet in width.

Viewing FIG. 13, bottom rail 218 has a shoulder 222 formed at its upper edge, against which the lower edge of aluminum plate 216 seats, so that the vertical interfaces of the aluminum plate 216 and of the bottom rail are substantially coplanar. Bottom rail 218 has an angularly downwardly extending rib 224 which serves as a reinforcing rib for the bottom rail, and also serves as a fastening abutment for the floor sheet 232 of the container. The bottom web of bottom rail 218 is formed with outwardly extending ribs 226 and 228 which provide increased structural strength to the bottom rail, to withstand bending stresses. The lower edge of aluminum plate 216 is fastened to bottom rail 218, as by a continuous weld. Bottom rail 218 is preferably an aluminum alloy extrusion of 7005-T53 alloy, having a tensile yield point of 42,000 p.s.i.

The floor supporting structure of the container 200 is formed by a multiplicity of extruded aluminum I-beams 230 which are fastened at their opposite ends to the aluminum rails 218, preferably by welding. In the container shown in the drawings, which has an outside length of forty feet, approximately 38 such I-beams are fastened between the bottom rails, the I-beams being spaced apart a distance of approximately one foot. The I-beams are extrusions of 6061T6 aluminum, and the substantial number of I-beams illustrated are utilized because for highway transport the load is required to be supported on chassis frames which are approximately forty inches wide.

The floor of the container is formed by aluminum sheets 232, each of which occupies the entire length of the container and slightly less than ½ of the width of the container, the central section of the container between floor plates 232 being occupied by tension tie mounting tee extrusion 234. The floor members 232 are thin sheet aluminum, preferably formed of 5086-H34 material, and are welded at one end to the respective ribs 224 of bottom rail 218, and at the inner end are welded to the foot sections 236 of tension tie mounting members 234. The front and rear ends of each floor member 232 is welded to the webs 298 and 298' of each of the rear and front sills 292 and 292'. The foot 236 of tee member 234 is one-quarter inch thick and has a cut-out at either end to overlie the floor sheet 232 which is fastened thereto. The mounting tee 234 is an aluminum extrusion of 7005-T53 aluminum.

If desired, for additional strength, the upper web of each I-beam 230 may be apertured, as may the vertical sections 238 of the tee member 234, to permit fastening by a screw through the I-beam and member 234.

Spaced tension ties 240 are fastened to the floor mounting tee 234 by welding to web 238. Tension ties 240 are preferably hollow cylinders, extruded from 6061T4 aluminum, having an outside diameter of 1¾ inches. The upper end of each of the tension ties 240 is fastened, as by welding, to the depending web section 244 of the roof tee mounting member 242. Roof tee mounting member 242 is an extrusion of aluminum alloy 7005T53, which extends the entire length of the container 200.

Viewing FIG. 11, it will be noted that the tension ties 240 only occupy approximately ⅔ of the interior length of container 200. The reasons for this is the fact that the most substantial bursting forces are located toward the lower end of the container, due to the pressure of the contents of the container when the container is tilted for unloading of the container. For this same reason, the tension ties at the discharge end of the container are more closely spaced than the tension ties farther away from the discharge end of the container. The spacing between the tension ties at the discharge end of the container is approximately fourteen inches, whereas the spacing of the tension ties toward the input end of the container is about eighteen inches. The tension ties terminate approximately nineteen feet inboard the input end of the container.

As also seen in FIG. 13, the upper end of each aluminum alloy plate 216 is fastened, as by a continuous weld, at the shoulder 248 of a roof corner member 220. Each roof corner member 220 is an extrusion of 7005-T53 aluminum, and has a vertically extending web section 250, which includes the shoulder 248, and a horizontally extending roof shelf section 252 which includes three depending rib members 254, 256 and 258. The purpose of these depending rib members 254, 256 and 258 is to strengthen the roof member and resist buckling.

Figure 15:
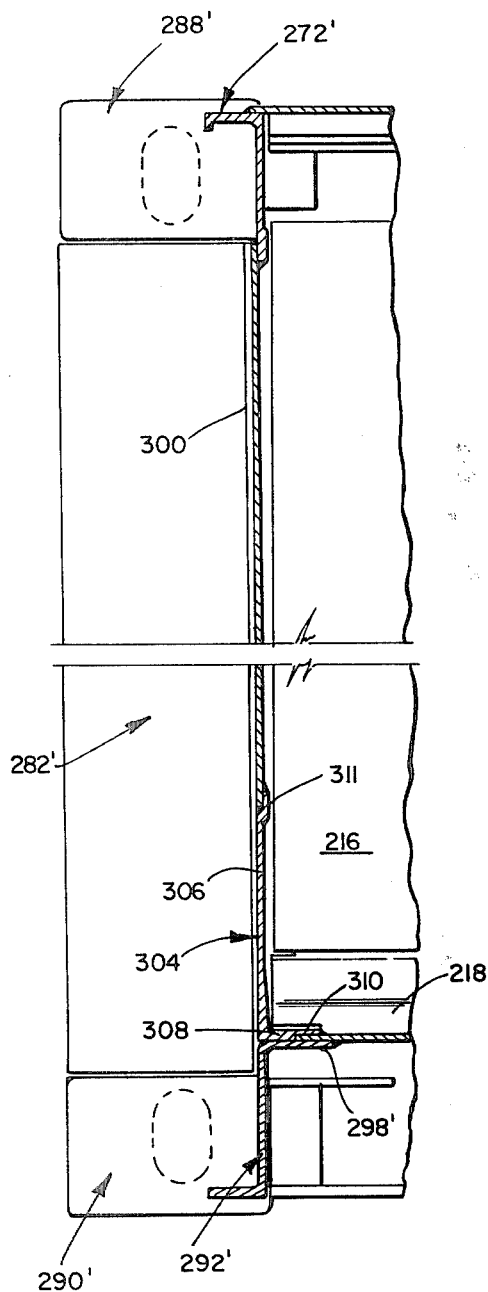
FIG. 15 is a partial cross-sectional view of the bulk cargo-carrying container, taken along line 15—15 of FIG. 10.
Figure 14:
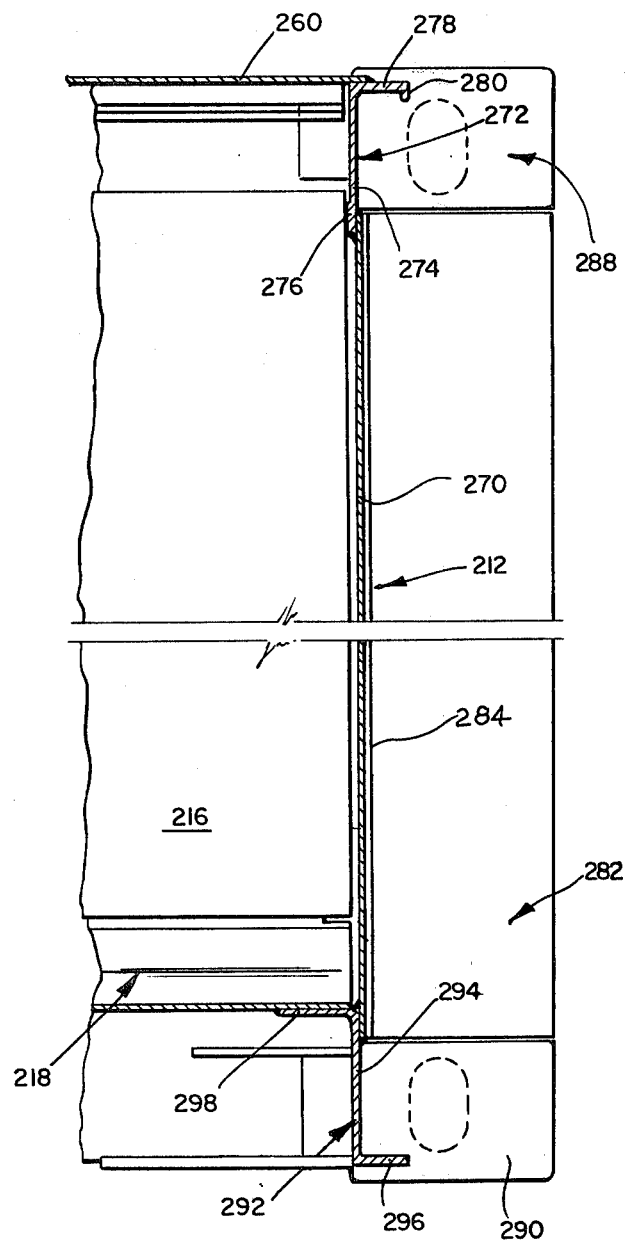
FIG. 14 is a partial cross-sectional view of the bulk cargo-carrying container, taken along line 14—14 of FIG. 10.

The roof sheets 260 overlie the horizontal webs 252 of the respective roof corner members 220, and are fastened thereto at their overlapping edges by continuous welds. The opposite, longitudinally extending edges of the roof sheets 260 are fastened, as by welding, to the shoulders 264 of the horizontal web section 262 of roof tee member 242. The roof sheets 260 are fastened at the loading and discharge ends of the container to the horizontal webs 278 and 278' of headers 272 and 272', as best seen in FIGS. 14 and 15. Roof sheet members 260 are plates of 5086-H34 aluminum, preferably 3/16 inch in thickness.

The rear end 212 of container 200 is formed of a rolled aluminum plate 270. Aluminum plate 270 has a thickness of 3/16 inch and a tensile yield point of at least about 25,000 p.s.i., and is preferably formed of 5086-H34 aluminum alloy. Plate 270 is fastened at its upper end to vertical web 274 of header 272. The lower end of vertical web 274 is formed with a reinforcing rib 276, to increase the structural strength of the web. Header 272 has a horizontally extending roof supporting web 278 which has a reinforcing rib 280 at its outer extremity. The edges of roof sheets 260 overlap and roof tee mounting member 242 butts the webs 274 and 274' of headers 272 and are fastened thereto, as by welding. At each end of the rear section 212 of container 200 is a corner post 282 which extends substantially the entire vertical distance between the upper and lower corner fittings 288 and 290 which are fastened thereto and to the roof corner extrusions 220 and header 272, and floor corner extrusions 218 and 292, as by welding. The corner posts 282 are C-shaped in cross-section and have vertically extending coplanar lips 284 which overlap the outer face of aluminum plate 270, which is fastened thereto by a continuous weld. Plate 270 extends past the inner lip 284 and is welded to the outer lip 284.

Each corner post 282 is an aluminum alloy extrusion of 7005-T53 aluminum, having a minimum tensile yield point of at least about 42,000 p.s.i. The reason for the selection of the particular aluminum for the corner post is to provide the substantial compressive strength needed to withstand stresses due to stacking of a multiplicity of containers on a ship or railroad car or in storage areas.

The corner fittings 288 and 290 which are respectively welded to the corner posts and to the abutting edges of the respective headers, rails and sills, are formed of 7005-T63 aluminum alloy, which is selected to provide the necessary strength, weldability and ductility. The corner fittings are forgings of that aluminum alloy, and generally have the physical characteristics, described supra with respect to the corner fittings of container 10, including a minimum percent elongation of twelve percent and tensile yield point of at least about 42,000 p.s.i.

The lower end of the rear plate 270 is fastened, as by welding, to the vertical web 294 of sill 292. Sill 292 also includes a lower, horizontally extending web 296 and an upper horizontally extending web 298. Sill 292 is an extrusion of 6061-T6 aluminum alloy. Rail 218 is fastened to and seats on the inwardly extending horizontal section 298 of sill 292.

As seen in FIG. 15, the input (front) end 210 of the container is formed by rolled aluminum plate 300. Aluminum plate 300 is formed of the same material and is of the same thickness as plate 270 which forms the discharge end of the container. Plate 300 is fastened, as by welding, to front header member 272' which is identical to rear header member 272. At the lower end of the front end of the container there is located a sill member 292' which is identical to sill 292 at the discharge end. Located above the bottom sill 292' of the loading end of the container is a front sill upper extrusion member 304. This member 304 has a vertical portion 306 and a lower horizontally extending web 308. The horizontally extending web 308 has a cut out 310 in which the forward ends of the floor plates 232 are fastened, as by a suitable weld seam. The forward edges of the floor plates 232 are also welded, by suitable weld seams, to upper extension 298' of sill member 292'. A tunnel cut-out (not shown) may be formed in the base of the front of the container to accommodate certain types of chassis which could be used with the container. The function of front sill upper extrusion 304 is to form a connection over the tunnel cut-out and support the front of the tunnel. Front sill upper extrusion 304 has a shoulder 311 at its upper end in which the lower end of the front plate 300 is seated and to which the lower end of front plate 300 is fastened as by a weld seam. The coupling member 312 for loading cargo into the container extends through a suitable aperture (not shown) in plate front 300, and is welded to plate front 300 in sealing relation. Coupling member 312 has a 4" inner diameter, and is provided with a quick coupling adapter, of a type which is well-known in the art, for connecting the coupling member to a suitable flexible hose, which is supplied with fluent solid material, such as pelletized plastic, from a suitable hopper. Coupling member 312 is connected to a tube 314, constructed of rigid, non-corrosive material, such as stainless steel, which tube has a length of approximately seventeen feet and an inner diameter of four inches. The inner end of the tube is rigidly mounted within container 200 by upper and lower mounting members 316 and 318 which are fastened to mounting sleeve 320, and are formed of aluminum plates. Mounting members 316 and 318 are respectively fastened to the upper tee 242 and lower rail members 218, as by welding. Formed in the front plate 300, below the header 272' is a manhole with a hinged fill cover 322, the purpose of which is to provide access to the container to complete filling. After most of the container has been filled through coupling member 312, the remainder of the container may be filled through the manhole.

Pairs of corner fittings 290' and 288' are respectively fastened to the corner posts 282' at their respective lower and upper edges and to the corresponding abutting edges of the rails, sill and header, as by welding. The corner fittings 290' and 288' are of the same construction and material as corner fittings 288 and 290.

As best seen in FIG. 12, extending through suitable apertures in plate 270 of discharge end 212 are two valved discharge ports with quick coupling adapters, which discharge ports have 6" inner diameters, and are of a construction which is well-known in the art. The discharge ports are respectively designated 326 and 328, and each is provided with a handle lock 330 and 332.

The bulk cargo container 200 may be internally reinforced with suitable gussets and ribs (not shown), to provide additional structural strength to the container, if desired.

The bulk commodity container functions as follows. The container is designed to be carried on a ship, and is usually transported by truck on special adapter frames. During loading, a flexible hose from a hopper is connected to the quick coupling adapter of coupling 312, and the hydraulic pressure of a solids pump forces the solid, particulate material through fill tube 314.

In order to insure substantially complete filling of the container the remainder is filled through the manhole by opening cover 322.

The container is shipped, filled, in sealed relationship, on shipboard, by truck or by rail, and at port of destination, is unloaded, by connecting suitable outlet hoses to exhaust ports 326 and 328, and lifting the inlet end of the container by the use of suitable hooks or claws inserted through the apertures in the corner castings 288', or by the use of a tilting chassis or frame.

Viewing FIG. 16, there is seen another embodiment of the invention, in which the principles of the invention are incorporated into a frameless trailer body. The primary difference between a trailer body and a cargo-carrying container is the fact that the base of the trailer body is not provided with a bottom rail, and the king pin and landing gear may be fastened directly to the trailer body and suitable hardware for connecting running gear may also be provided. Due to the heavy loads borne by the king pin, landing gear and running gear, additional framing may be required in the base of the trailer body. Trailer bodies are not stacked on shipboard or on railroad cars like a container so that the construction of the trailer body may be different from the construction of a cargo-carrying container, because of the different uses to which the trailer body is put. Therefore, a trailer body need not have corner posts, as does a cargo-carrying container, since the purpose of the corner posts in the cargo-carrying container is to withstand the stacking loads created by stacking two or more containers vertically on a ship. Also, a trailer body need not have top and bottom rails and corner fittings, since a trailer body is not handled by hooks or like equipment; when a container is handled by hooks, the headers, sills and rails are required to protect the container from damage resulting from impacts during handling.

FIGS. 16, 17 and 18 illustrate a trailer body construction in accordance with the principles of this invention. The trailer body 400 comprises a pair of side walls 402 (only one of which is shown) which are formed of type 5052-H34 aluminum alloy plates, and have a thickness of at least 5/32 of an inch and a tensile yield point of at least 25,000 p.s.i. and preferably 35,000 p.s.i. The aluminum plates 402, in a preferred embodiment of the invention, have an overall length of 27 feet and a height of approximately 9 feet. The upper end of each of the aluminum plates 402 is fastened, as by rivets 404, to the top rail 406.

The top rail 406 has a main horizontal web portion 408, a dependent web portion 410, to which the rivets 404 are fastened, and a lip 412 which overlaps the upper edge of plate 402 to direct water away from the container as it runs off; ledge 406 extends inwardly of vertical web portion 414 to support roof bow 418, which is fastened thereto by the screws and lock nuts designated as 420; the top rails have an upper, horizontally extending portion 422, which terminates in a beaded end section 424, the purpose of which is to finish off the edge of the roof sheet. The roof sheet 428 is fastened to section 422 of the top rail by rivets 430.

The floor of the trailer is formed of a multiplicity of transverse steel I-beams 442 which are fastened at their ends to the respective plates 402 and 434 by means of bolts and nuts 446 which fasten the vertical webs 444 at the ends of the I-beams 442 and are spaced from the inner faces of the side panels 402 and end panels 434 by flexible spacer members 448. Mounted transversely with respect to the I-beams 442, at either end thereof, are aluminum extrusions 452 having a horizontal section 456, which is fastened to the upper web 450 of each I-beam 442, vertical section 454, and upper horizontal section 458 which terminates in curved sealing strip containing portion. A flexible rubber sealing strip is held in sealing relationship against the inner side and end panels by the curved sections 458.

Mounted on the I-beams 442, and supported by ledges 456 of extrusions 452, are floor boards 462, which are conventionally oak, but may also be aluminum extrusions.

The front end of the trailer is formed by a front plate 432 and by a side plate 434 located on either side of the front plate. The inner edge of each plate 434 overlaps an edge of and is riveted to front plate 432 by rivets 438. The opposite ends of plates 434 are fastened to the proximate ends of plates 402 through aluminum extrusion 440 which has two legs, one of which is riveted to one of the corresponding side panels respectively. If desired, both ends of plates 434 may overlap and be riveted to the adjacent plates, rather than use member 440.

The reason why the plates 402, 434 and 432 are riveted, rather than welded, is because the understructure is formed primarily of steel, which requires mechanical fastening. Since the plate, in such instances, must be mechanically fastened at the bottom, it is more economical to mechanically fasten the plates to the roof structure, although welding at the top of the plates to the roof structure is feasible.

Each of the two top rails 406 is an extrusion of aluminum alloy 6061-T6, having a minimum tensile yield point of about 35,000 p.s.i. The roof sheet is a rolled sheet of aluminum alloy, type 3003-H34, having a minimum tensile yield point of at least about 17,000 p.s.i. The roof sheet 428 is also secured to the roof bows 418 by a suitable adhesive such as polysulfide rubber-epoxy, of a type which is well-known in the art. The roof bows 418 extend across the width of the trailer body, along the entire length of the trailer body, and in a trailer body of the type described, having an overall length of 28 feet, approximately 13 roof bows, spaced apart two feet would be used to support the roof. The roof bows are aluminum extrusions, formed of 6061-T6 aluminum alloy.

The particular embodiment of the trailer body construction of this invention, shown in FIGS. 16 through 18 inclusive, is seen, in FIG. 16, to have a wedge front construction, whereby the front of the trailer body comprises the plate 432 having a width of approximately four feet 10 inches, and two wedge panels designated by numeral 434. Each of the wedge panels 434 has a width of about twenty-three inches. Panels 432 and 434 are aluminum plates formed of the identical material as panel 402. However, although it is preferable for the end panels 432 and 434 to be formed of the materials indicated, it is not necessary for either of the end panels of the trailer body to be aluminum plates, and they may be formed of conventional materials. The rear end of the trailer body is not shown, but is of conventional steel construction, and may be similar to that shown in FIG. 8, comprising a corner post extrusion, preferably riveted to the rear inner faces of each of the plates 402 and supporting the hinges and door. A rear header is fastened to the corner posts and supports the roof at its rear. The corner posts hang hinges on which the doors which close the rear of the trailer, and which would be conventional construction are supported. If desired, an overhead door could be substituted for the hinged door.

At the front end of the FIG. 16 are shown the connecting members for connecting the electrical and brake controls for the trailer body to the tractor.

Shown in phantom in FIG. 16 are the landing gear 466 and the running gear 468 which are mounted to the I-beams on the underside of the trailer body, in a manner which is well-known in the art, and forms no part of this invention.

Although the trailer body of this invention is seen as having side walls and a front end wall and wedge-shaped connecting sections all formed of aluminum plates in accordance with the principles of this invention, it is only necessary, in the practice of this invention, that the side walls be formed of such aluminum plates, although the embodiment shown is the preferred embodiment for a trailer body. It is also within the purview of this invention to construct the front end of the trailer body of a single aluminum plate of the same material and characteristics as the side panels to achieve the benefits of lightness and low maintenance cost also provided by the side panels. Conventional trailer body front end constructions, using, for example, the well-known sheet and post construction may also be utilized, if desired. The wedge shaped front end is advantageous since it permits the tractor to move through a more acute angle with respect to the trailer body, thereby achieving a shorter turning radius and greater handling ease.

Trailer bodies can often be much longer than containers. These trailers bodies can be as long as forty-five feet, whereas containers are usually about twenty to forty feet long. For this reason, the side panel used for each side panel of a trailer body constructed in accordance with this invention can be as long as forty-five feet, although considerably shorter trailer bodies, and therefore correspondingly shorter side panels, may also be constructed in accordance with this invention.

It is to be noted that, where appropriate, apertures for one or more doors could be formed in the aluminum side panels or end panels of a frameless container or trailer body and doors mounted in the apertures, in a manner which is well-known in the art, without departing from the purview of this invention.

Although the preferred aluminum alloys for use in the various members of a container or trailer body constructed in accordance with this invention have been disclosed, a wide variety of aluminum alloys is presently available, and new aluminum alloys will undoubtedly be available in the future. Such other alloys may readily be substituted for the alloys disclosed herein, so long as they have the minimum physical properties necessary for satisfactory performance in a container or trailer body, in accordance with the principles set forth herein. Of course, cost and ease of fabrication are additional practical considerations in determining the desirability of a particular alloy.

It will thus be apparent that, although the preferred embodiments of this invention have been disclosed, various changes and modifications in the disclosed embodiments can be made without departing from the spirit and scope of this invention.

What is claimed is:

1. A frameless cargo-carrying container or trailer unit comprising: a body comprising a floor, a front end, a rear end, and a pair of opposing sides, at least each of said sides consisting essentially of an aluminum alloy plate having a minimum tensile yield point of about 25,000 p.s.i., each of said plates having a substantially uniform thickness of at least about 5/32 of an inch, and means interconnecting said floor and each of said sides whereby at least about 67 percent of the load caused by the presence of cargo in the container or trailer body and created by dynamic forces during operation of said container or trailer body is borne by said sides.

2. Apparatus as set forth in claim 1, including a forged aluminum alloy corner fitting mounted in each corner of said body, the alloy of each such fitting having a minimum average percent elongation of about twelve percent.

3. Apparatus as set forth in claim 1, wherein said aluminum plates have inner faces, and wherein said body is substantially free of obstructions above said floor and within said inner faces.

4. Apparatus as set forth in claim 3, wherein each of said sides includes a top rail having a vertical inner face, means securing the upper edge of each side panel to the corresponding top rail, the inner face of each top rail being substantially coplanar with the inner face of the corresponding side plate.

5. Apparatus as set forth in claim 4, wherein each of said sides further includes a bottom rail having a vertical inner face, means securing the lower edge of each plate to the corresponding bottom rail, the inner face of each bottom rail being substantially coplanar with the inner face of said side plate.

6. Apparatus as set forth in claim 4, including a plurality of transversely extending beam members, means directly fastening the opposite ends of each of said beam members to the lower portion of the corresponding inner faces of said side plates.

7. Apparatus as set forth in claim 5, including a plurality of transversely extending beam members, means fastening the opposite ends of each of said beam members to the inner face of the corresponding bottom rail.

8. Apparatus as set forth in claim 2, including a vertically extending corner post located at each corner of the body, means fastening the respective vertical edges of said plates to the corresponding adjacent corner post, each corner post being an extrusion of the same aluminum alloy as the corner fittings.

9. Apparatus as set forth in claim 4, including a vertically extending corner post in each corner of said body, means fastening the respective vertical edges of each plate to the corresponding adjacent corner post, eight forged corner fittings, means mounting one fitting to each end of each corner post, each of said corner posts and corner fittings being formed of an aluminum alloy having a minimum average percent elongation of about twelve percent.

10. A frameless cargo-carrying container or trailer comprising: a body having a front end, a rear end, two sides, a floor, and a roof, said body comprising a vertical aluminum alloy corner post in each of its four corners, a pair of aluminum alloy top rails respectively interconnecting the top ends of said corner posts along said sides, a pair of aluminum alloy headers respectively interconnecting the upper ends of said corner posts at said front and rear ends, a pair of aluminum alloy sills respectively interconnecting the bottom ends of said corner posts at said front and rear ends, a pair of aluminum alloy bottom rails interconnecting the bottom ends of said corner posts along said sides, means rigidly fastening said floor to said side rails, an aluminum alloy side plate mounted on each side of said body, means rigidly fastening the edges of each of said side plates to the corner members and rails defining the corresponding side whereby at least about 67 percent of the load caused by the presence of cargo in the container or trailer body and created by dynamic forces during operation of said container or trailer body is borne by said sides, an aluminum alloy front plate mounted on the front end of said body, means rigidly fastening the edges of said front plate to the corresponding corner members, header and sill of said front end, each of said side plates and said front plate having a thickness of about 5/32 of an inch and a minimum tensile yield point of about 25,000 p.s.i.

11. An apparatus as set forth in claim 10, wherein said fastening means constitutes aluminum weld seams, and wherein said headers, rails and sills are formed of extruded aluminum alloys having a minimum tensile yield point of about 35,000 p.s.i.

12. Apparatus as set forth in claim 10, further including a forged aluminum alloy corner fitting mounted in each corner of said body, each such fitting defining a central cavity and a plurality of spaced slots leading into said cavity and adapted to receive a lifting member, the alloy of each fitting having an average percent elongation of at least about twelve percent.

13. Apparatus as set forth in claim 10, wherein said corner posts are formed of the same alloy as said corner fitting, and are welded to the respective adjacent corner fittings.

14. Apparatus as set forth in claim 10, wherein the inner face of the end of each of said front header, front sill and said rails adjacent to an edge of a plate defines a recessed shoulder against which such plate rests and to which such plate is welded.

15. Apparatus as set forth in claim 10, including a plurality of longitudinally spaced aluminum alloy beams, means fastening the opposite ends of each of said beams to the corresponding lower ends of said side plates, and a plurality of longitudinally spaced transverse aluminum alloy roof members, means fastening the opposite ends of said roof members to the corresponding top rails, and means mounting said roof members.

16. A frameless cargo-carrying container or trailer body comprising: a body comprising a floor, a front end, a rear door, a pair of opposing sides, and a roof, each of said sides comprising an extruded aluminum alloy bottom rail and an extruded aluminum alloy top rail, an extruded aluminum alloy front corner post, and an extruded aluminum alloy rear corner post, and an aluminum alloy plate side panel having a thickness of about 5/32 of an inch and a minimum tensile yield point of about 25,000 p.s.i., means rigidly fastening said corner posts and rails to said side plate, said front end comprising said front corner posts, an extruded aluminum alloy header, an extruded aluminum alloy sill, and an aluminum alloy plate front panel having a thickness of about 5/32 of an inch and a minimum tensile yield point of about 25,000 p.s.i., means rigidly fastening said front plate about its periphery to said front corner posts and said header and sill, said rear end comprising a pair of extruded aluminum alloy corner posts, an extruded aluminum alloy header, an extruded aluminum alloy sill, and door means movably mounted on said rear end, a plurality of longitudinally spaced, transversely extending aluminum alloy beam members, means fastening the opposite ends of each of said beam members to said bottom rails, whereby at least about 67 percent of the load caused by the presence of cargo in the container or trailer body and created by dynamic forces during operation of said container or trailer body is borne by said sides, said floor comprising plurality of floor panels mounted above said beam members, a plurality of longitudinally spaced, transversely extending aluminum alloy roof members, means fastening the opposite ends of said roof members to said top rails, a cover panel overlying said roof members, and means fastening said cover panel to said headers, said top rails, and said roof members.

17. Apparatus as set forth in claim 16, including a forged aluminum alloy corner fitting mounted in each corner of said body, the alloy of each corner fitting having a minimum average percent elongation of about twelve percent.

18. Apparatus as set forth in claim 17, wherein said corner posts are formed of the same alloy as said corner fittings.

19. Apparatus as set forth in claim 16, wherein said headers, said sills, and said rails are each formed of an aluminum alloy having a minimum tensile yield point of about 35,000 p.s.i.

20. Apparatus as set forth in claim 16, wherein the thickness of each of said side plates and said end plate is at least 3/16 of an inch and the minimum tensile yield point thereof is at least about 34,000 p.s.i.

21. Apparatus as set forth in claim 16, wherein each of said rails, said front header and said front sill has a vertical inner face defining a recessed shoulder at the edge proximate the corresponding plate, each of said plates being fastened to such adjacent shoulders, whereby said container has no inner protrusions beyond such inner faces between said floor and said roof members and between said corner posts.

22. A frameless cargo-carrying container or trailer body comprising: a roof, a floor, two ends and twos sides, each of said sides consisting essentially of an aluminum alloy plate having a thickness of about 5/32 of an inch, and a minimum tensile yield point of about 25,00 p.s.i. and means interconnecting said floor and each of said sides whereby at least about 67 percent of the load caused by the presence of cargo in the container or trailer body and created by dynamic forces during operation of said container or trailer body is borne by said sides.

23. Apparatus as set forth in claim 22, wherein at least one of said ends consists essentially of an aluminum alloy plate of at least about 5/32 of an inch thickness, and a minimum tensile yield point of about 25,000 p.s.i.

24. Apparatus as set forth in claim 23, wherein the thickness of each of said plates is about 3/16 of an inch, and said minimum tensile yield point is about 34,000 p.s.i.

25. A frameless cargo-carrying container or trailer body comprising: a body comprising opposing side panel means and a floor, means fastening said floor to said side panel means whereby at least about 67 percent of the load caused by the presence of cargo in the container or trailer body and created by dynamic forces during operation of said container or trailer body is borne by said sides, at least each of said side panel means consisting essentially of an aluminum alloy plate having a minimum tensile yield point of about 25,000 p.s.i. and having a substantially uniform thickness of about 5/32 of an inch.

26. A frameless trailer body comprising: a pair of opposing side panel means, a floor, a roof and a front end, at least each of said side panel means consisting essentially of an aluminum alloy plate having a minimum tensile yield point of about 25,000 p.s.i. and having a substantially uniform thickness of about 5/32 of an inch, said side panel means having upper edges and lower edges, means fastening said floor to said side panel means proximate to said lower edges whereby at least about 67 percent of the load caused by the presence of cargo in the container or trailer body and created by dynamic forces during operation of said container or trailer body is borne by said sides, and means fastening said roof to said side panel means proximate said upper edges.

27. Apparatus as set forth in claim 26, wherein said front end of said trailer body comprises at least one aluminum alloy plate having a minimum tensile yield point of about 25,000 p.s.i. and having a substantially uniform thickness of at least about 5/32 of an inch, and means fastening said front end to said side panel means, said floor and said roof.

28. Apparatus as set forth in claim 27, wherein said front end comprises three aluminum plates, one central plate being transverse to said side panel means, and the other two plates being on opposite sides of said one aluminum plate, means interconnecting said one plate, the other plates and the respective side panel means, said other plates forming a beveled surface at each edge of the front end of said trailer body.

29. Apparatus as set forth in claim 26, wherein said aluminum plates have inner faces, and wherein said body is substantially free of obstructions above said floor and within said inner faces.

30. Apparatus as set forth in claim 26, wherein said floor comprises a plurality of coplanar transverse steel I-beams, and rivet means fastening said I-beams to the adjacent edges of said side panels.

31. A frameless cargo-carrying container comprising an elongated body comprising a pair of opposed side panel means, a floor, a roof, a front end and a rear end forming a hermetically sealed unit, at least each of said side panel means consisting essentially of an aluminum alloy plate having a minimum tensile yield point of about 25,000 p.s.i. and having a substantially uniform thickness of about 5/32 of an inch, means interconnecting said floor and each of said sides whereby at least about 67 percent of the load caused by the presence of cargo in the container and created by dynamic forces during operation of said container is borne by said sides, and sealable means mounted in at least one of said ends for permitting filling and discharging of said container.

32. Apparatus as set forth in claim 31, including a multiplicity of spaced tension struts mounted along the longitudinal axis of said container, means fastening each of said struts to the floor and to the roof of said container, said struts being spaced in a pattern whereby the spacing between struts increases progressively from one end of the container toward the other end of the container.

33. Apparatus as set forth in claim 32, wherein each of said struts is formed of aluminum material.

* * * * *